(12) United States Patent
Fuchs

(10) Patent No.: US 10,558,634 B2
(45) Date of Patent: Feb. 11, 2020

(54) MULTI-USER PROBABALISTIC ARRAY

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 337 days.

(21) Appl. No.: 15/257,216

(22) Filed: Sep. 6, 2016

(65) Prior Publication Data

US 2018/0067936 A1 Mar. 8, 2018

(51) Int. Cl.
*G06F 16/22* (2019.01)
*G06F 7/20* (2006.01)
*H04L 29/08* (2006.01)

(52) U.S. Cl.
CPC ............ *G06F 16/2255* (2019.01); *G06F 7/20* (2013.01); *H04L 67/22* (2013.01)

(58) Field of Classification Search
CPC .. G06F 16/137; G06F 16/152; G06F 16/2255; G06F 7/20; H04L 9/00; H04L 9/06; H04L 9/0643; H04L 9/3236; H04L 9/3239; H04L 9/3242; H04L 67/22
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

U.S. Appl. No. 13/986,251, filed Apr. 16, 2013.

*Primary Examiner* — David T. Brooks
(74) *Attorney, Agent, or Firm* — Dergosits & Noah LLP; Todd A. Noah

(57) ABSTRACT

A system receives an association of first item with first system user, generates first hash value by applying first hash function associated with first system user to first item identifier associated with first item, and sets a bit corresponding to first hash value in array. The system receives an association of second item with second system user, generates second hash value by applying second hash function associated with second user to second item identifier associated with second item, and sets a bit corresponding to second hash value in array. The system receives a request to determine whether third item is associated with first system user, generates third hash value by applying first hash function to third item identifier associated with third item, and outputs message that third item is not associated with first user if a bit corresponding to third hash value is not set in array.

18 Claims, 4 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,687,375 B1 * | 2/2004 | Matyas, Jr. ............ H04L 9/0866 380/30 |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,940,976 B1 * | 9/2005 | Matyas, Jr. ............ H04L 9/0866 380/280 |
| 7,000,110 B1 * | 2/2006 | Terao .................... H04L 9/3218 380/28 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,647,875 B1 * | 5/2017 | Lambert ................ H04L 41/00 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0182726 A1 * | 7/2009 | Wang ................ G06F 17/30979 |
| 2010/0070514 A1 * | 3/2010 | Woodruff ............ G06F 17/3089 707/754 |
| 2012/0233137 A1 | 9/2012 | Jakobson et al. |
| 2013/0010950 A1 * | 1/2013 | Kerschbaum ........... H04L 9/008 380/30 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0339526 A1 * | 12/2013 | Ruellan ............... H04L 67/2814 709/226 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0347585 A1 * | 12/2015 | Klotz ................ G06F 17/30867 707/706 |
| 2015/0350087 A1 * | 12/2015 | Hong .................. H04L 67/1023 370/230 |
| 2018/0053209 A1 * | 2/2018 | Curtin ................ G06Q 30/0246 |

* cited by examiner

MULTI-USER PROBABALISTIC ARRAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A Bloom filter is a space-efficient probabilistic data structure that can be used to test whether an item is a member of a set of items. An empty Bloom filter is a bit array of m bits that are all equal to 0. The bit array uses k different hash functions, each of which hashes one item to one of the m bits in the bit array. When an item is added to a set of items, each of the k hash functions is applied to the item to generate k hash values, and the bits that correspond to the k hash values are set to 1 in the bit array. Therefore, when n items are added to a set of items, the k hash functions are applied to each of the n items to generate n*k hash values, and the corresponding n*k bits are set in the array, with relatively few of the hash functions generating the same hash values for different items. After all of the additions of items to the set of items, the proportion of bits that are still equal to zero may be calculated as being equal to $(m-(n*k))/m$, or $1-(n*k/m)$. Therefore, if any item that is not in the set of items is hashed by any of the k hash functions, the likelihood that the resulting hash value corresponds to a bit that is already set in the array equals $1-(n*k/m)$. To test whether an item is in the set of items, the k hash functions are applied to the tested item to generate k hash values, and the bits that correspond to these k hash values are tested in the bit array. If any of these tested bits is 0, the item is definitely not in the set of items, because all of the tested bits would have been set to 1 if the item had been added to the set of items. If all of the tested bits are 1, then either the item is in the set of items, or these tested bits have by chance been set to 1 during the insertion of other items, which would be a false positive match. Since false positive matches are possible and false negatives matches are not, a test of whether an item is in a set of items results in either the conclusion that the item is possibly in the set of items or the conclusion that the item is definitely not in the set of items. The more items that are added to the set of items, the larger the probability of false positive matches.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
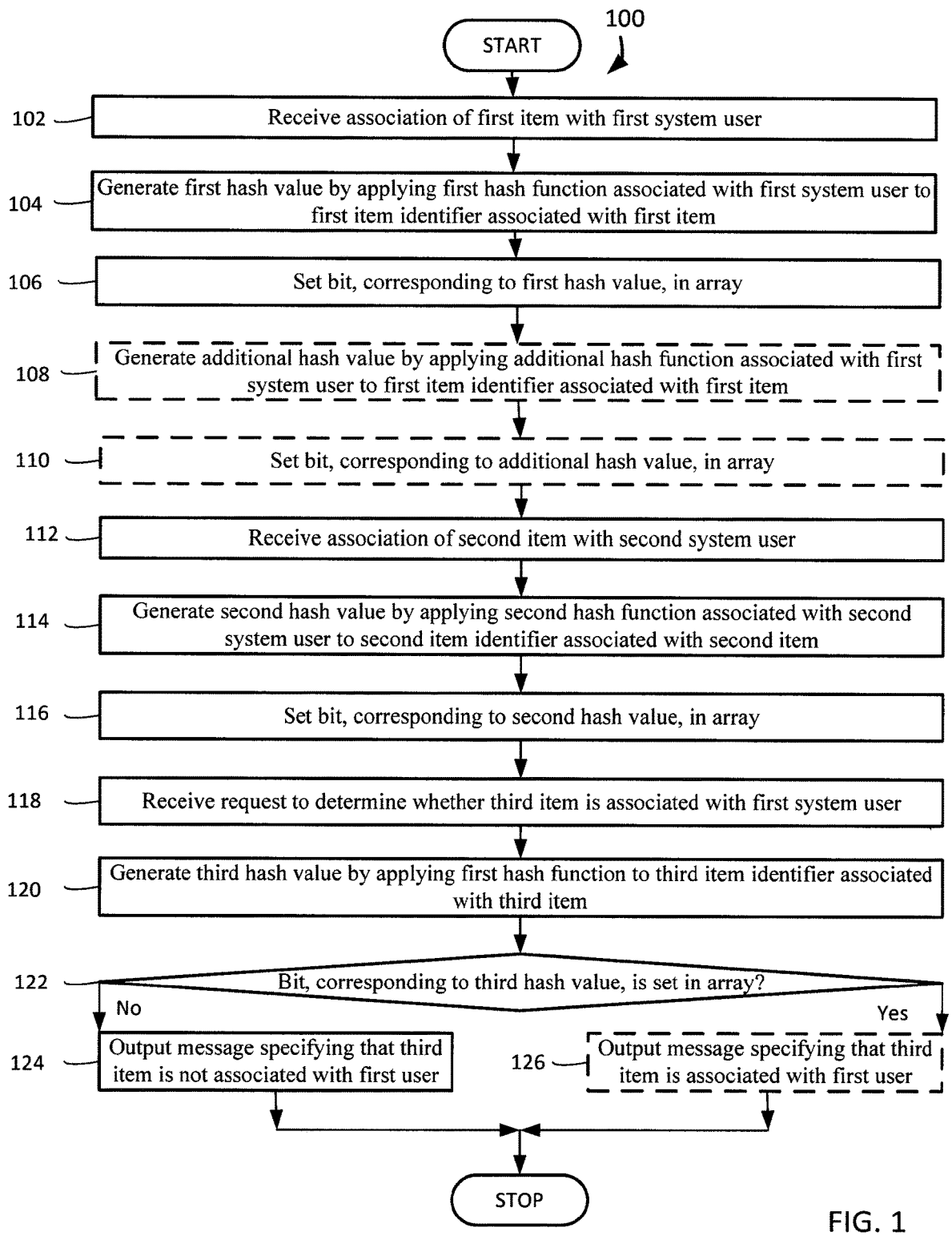
FIG. 1 depicts an operational flow diagram illustrating a high level overview of a method for a multi-user probabilistic array, in an embodiment.

Instead of spending a significant amount of resources accessing a relatively slow access device to determine whether an item is in a set of items, a database system can use a Bloom filter that is stored in memory to quickly determine whether the item is in the set of items, thereby eliminating relatively slow accesses for many items that are not in the set of items. For example, a database system uses a Bloom filter to quickly determine whether an account is an organization's set of accounts, reads the account from a relatively slow disk only if the Bloom filter indicates that the account is in the organization's set of accounts, and enables a member of the organization to view any account information read from the disk. In another example, a database stores accounts and a set of customers, each of which has access to some set of accounts. This database can use a Bloom filter to quickly determine whether an account is in a customer's set of accounts and retrieve the account only if the Bloom filter indicates that the account almost certainly is in the customer's set of accounts. This database might use further Bloom filters as part of actually retrieving the item. A Bloom filter is designed such that it can only determine whether an item, such as an account, is in one set of items, such as one organization's set of accounts. Therefore, if a database system processes items for multiple organizations, and each item may be accessed or owned by multiple organizations, the database system may have to use a different Bloom filter for each of the multiple organizations. The need to use a different Bloom filter for each of multiple organizations would adversely affect the database's performance.

In accordance with embodiments described herein, there are provided methods and systems for a multi-user probabilistic array. A system receives an association of a first item with a first system user. The system generates a first hash value by applying a first hash function associated with the first system user to a first item identifier associated with the first item. The system sets a bit corresponding to the first hash value in an array. The system receives an association of a second item with a second system user. The system generates a second hash value by applying a second hash function associated with the second user to a second item identifier associated with the second item. The system sets a bit corresponding to the second hash value in the array. The system receives a request to determine whether a third item is associated with the first system user. The system generates a third hash value by applying the first hash function to a third item identifier associated with the third item. The system outputs a message specifying that the third item is not associated with the first user if a bit corresponding to the third hash value is not set in the array.

For example, a database system receives a message indicating that Organization A has purchased the rights to access Account X, generates an Organization A-Account X hash value by applying Organization A's hash function to Account X's unique identifier, and sets the bit for the Organization A-Account X hash value in a bit array. The database system receives a message indicating that Organization B has purchased the rights to access Account Y, generates an Organization B-Account Y hash value by applying Organization B's hash function to Account Y's unique identifier, and sets the bit for the Organization B-Account Y hash value in the bit array. The database system receives a request to determine whether Organization A has already purchased the rights to access Account Z, and generates an Organization A-Account Z hash value by applying Organization A's hash function to Account Z's unique identifier. The database system outputs a message specifying that Organization A has not purchased the rights to access Account Z if the bit for the Organization A-Account Z hash value is not set in the bit array. If the bit for the Organization A-Account Z hash value is set in the bit array, the database system reads the Account Z information from a relatively slow disk, which enables Organization A to view the Account Z information read from the disk. Whether the tested bit was set or not set, the database system avoided spending a significant amount of resources accessing the relatively slow disk to determine whether Organization A had already purchased the rights to access Account Z.

Systems and methods are provided for a multi-user probabilistic array. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for a multi-user probabilistic array will be described with reference to example embodiments. The following detailed description will first describe a method for a multi-user probabilistic array, and then describe an extremely simplified example of a multi-user probabilistic array.

While one or more implementations and techniques are described with reference to an embodiment in which a multi-user probabilistic array is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed. Likewise, embodiments may be practiced in cloud-based storage systems that make up an on-demand computing platform such as those provided by Amazon® Web Services.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for a multi-user probabilistic array. When adding an item to a user's set of items, a databases system creates a user-specific hash value by applying a user-specific hash function to the item's identifier, and sets a bit that corresponds to the user-specific hash value in an array. After adding items to the user set of items, the database system receives a request to test whether an item is in the user's set of items, creates a test hash value by applying the user's specific hash function to the tested item's identifier, and tests the bit that corresponds to the test hash value in the array. If the tested bit is not set, the tested item is not in the user's set of items, and the database system does not need to read the item from a relatively slow access device. If the tested bit is set, the tested item is very likely in the user's set of items, and the database system reads the item from a relatively slow access device.

A system receives an association of a first item with a first system user, block 102. Receiving this information enables the system to set an array bit which indicates that the first item is in the first system user's set of items. For example and without limitation, this can include the database system receiving a message indicating that Organization A has purchased the rights to access Account X. Aspects of the database system are described below in reference to FIG. 3 and FIG. 4. A system user can be anyone or anything that the database system can associate with an item, such as an organization, a person, or a person in an organization. An item can be anything that the database system can associate with a system user, such as an account, a lead, an opportunity, a contact, a product, a service, or any digital object. An association can be any relationship, connection, or link that the database system can establish between a system user and an item. Examples of associations include an organization purchasing the rights to access account information for an account, a person establishing an online social network friendship with another person, and an organization member exchanging digital credit for the right to access contact information for a person. A user's set of items can be any group or collection of entities that are associated with a specific user, such as all of an organization's accounts, a list of a person's online social network friends, and an aggregation of an organization member's contact information.

Having identified a first item associated with a first system user, the system generates a first hash value by applying a first hash function associated with the first system user to a first item identifier associated with the first item, block 104. This first hash value enables the system to set an array bit which indicates that the first item is in the first system user's set of items. By way of example and without limitation, this can include the database system generating a hash value by applying Organization A's hash function to Account X's unique identifier. A hash function can be any relation between an input and an output that can be used to map data of arbitrary size to data of fixed size. Examples of hash functions include the Bernstein hash, the Fowler-Noll-Vo hash function, the Jenkins hash function, Pearson hashing, and Zobrist hashing. A hash value can be the value returned by a hash function, and can also be called a hash code, a hash sum, or a hash.

An identifier of an item, which may be called an item identifier, is a sequence of characters used to refer to the item, such as an account number or an account name. Each item identifier is unique so that different hash values are generated when one hash function is applied to different item identifiers. Although examples describe the database system generating a hash value by applying a hash function to a unique identifier for an item, the database system may generate a hash value by applying a hash function to the item itself. The database system may apply a hash function to a unique identifier for an item rather than to the item itself because the unique identifier for the item may be significantly smaller than the item, thereby resulting in a quicker and more efficient generation of the hash value.

The database system can apply a hash function to an item identifier through the process of creating a product by multiplying an item identifier by a prime number, and creating both a quotient and a remainder by dividing this product by a number associated with a size of a bit array that sets bits for corresponding hash values, with the hash value equaling the remainder. Calculating the remainder after a division may be referred to as a modulo operation. For example, the database system multiplies Account X's 8 digit unique identifier by Organization A's 32 bit prime number to calculate a product. Then the database system divides this calculated product by another prime number (which may be a prime number that is close to the number of bits in the 1 gigabyte of memory used to store the bit array that stores the subsequently generated hash value) to result in a quotient and a remainder, and uses the remainder as the hash value for the combination of Organization A and Account X.

If the database system implements a single hash function by multiplying an item identifier by a prime number and then taking the modulus with another prime number, this single hash function will generate the same hash value for two different item identifiers only if one item identifier is m times the other item identifier, with m being the size of the bit array that sets bits for corresponding hash values. If m is significantly greater than the largest value of any item identifier, and also significantly greater than the number of items in a set of items multiplied by the number of hash functions, then this single hash function will never generate the same hash value for two different item identifiers. Consequently, the only potential hash value conflicts could occur when two different hash functions generate the same hash value for two different item identifiers. As each prime number used by a corresponding hash function creates a different cycle of 1 through m, such a hash value conflict could only occur when a first item identifier multiplied by a first prime number modulo m equals a second item identifier multiplied by a second prime number modulo m, which becomes less and less likely as the size of the prime numbers grows.

After generating a first hash value for a first item, the system sets a bit corresponding to the first hash value in an array, block 106. This bit indicates that the first item is in the first system user's set of items. In embodiments, this can include the database system setting the bit for the Organization A-Account X hash value in a bit array to the value of "1." Although this example describes the database system setting a bit in a bit array, the database system may record the generation of a hash value by storing any value in any type of data structure that enables the database system to determine if the database system recorded the generation of a specific hash value. This example describes the database system setting a specific bit in a bit array to the value of "1" to record the generation of a specific hash value in the bit array which had all of its bits initialized to the value of "0."

However, the database system can set a specific bit in a bit array to the value of "0" to record the generation of a specific hash value in the bit array which had all of its bit initialized to the value of "1." The database system can set a bit corresponding to a hash value in an array by setting a bit that is associated with a number that equals the numerical value of the hash value. For example, the database system generates the hash value of 918,273,745, and sets the 918,273,745$^{th}$ bit in the array to the value of "1." In an alternative example, the database system generates the hash value of 918,273,745, and sets the 918,273,746$^{th}$ bit corresponding to the number 918,273,745 in the array to the value of "1" because the first bit in the array is numbered "0" instead of being numbered "1." Since the array may be significantly large, the database may keep a data structure with the numbers and only build a bit array when the data structure becomes too large to be efficiently searched.

Having set a bit for a first hash value, the system optionally generates an additional hash value by applying an additional hash function associated with the first system user to the first item identifier associated with the first item, block 108. This additional hash value enables the system to set an additional array bit which indicates that the first item is in the first system user's set of items. For example and without limitation, this can include the database system generating an additional hash value for Organization A's purchase of the rights to access Account X by applying Organization A's additional hash function to Account X's unique identifier. If the probability of false positive matches is determined to be too high, the database system may apply a single system user's multiple hash functions to an item identifier, and then set the bits that correspond to the generated multiple hash values in the bit array. Although this example describes the database system generating a second hash value by applying a second hash function to the same item identifier associated with the same system user, the database system may generate any number of hash values by applying any number of hash functions to the same item identifier associated with the same system user.

After optionally generating an additional hash value for a first item, the system optionally sets a bit corresponding to the additional hash value in the array, block 110. This additional bit indicates that the first item is in the first system user's set of items. By way of example and without limitation, this can include the database system setting the bit for the additional Organization A-Account X hash value in the bit array. Although this example describes the database system setting a second bit corresponding to a second hash value generated for the same combination of item identifier and system user, the database system may set any number of bits corresponding to any number of hash values generated for the same combination of item identifier and system user.

Having set at least one bit for a first hash value, the system receives an association of a second item with a second system user, block 112. Receiving this information enables the system to set an array bit which indicates that the second item is in the second system user's set of items. In embodiments, this can include the database system receiving a message indicating that Organization B has purchased the rights to access Account Y. The first system user may be a first tenant in a multi-tenant database system, and the second system user may be a second tenant in the multi-tenant database system. For example, Organization A and Organization B are 2 of 170,000 organizations that are tenants in a multi-tenant database system. Alternatively, the first system user and the second system user may be members of Organization A, and have different access rights to Accounts owned by Organization A, and Organization A and Organization B are 2 of 170,000 organizations that are tenants in a multi-tenant database system.

After identifying a second item and a second system user, the system generates a second hash value by applying a second hash function associated with the second user to a second item identifier associated with the second item, block 114. The second hash value enables the system to set an array bit which indicates that the second item is in the second system user's set of items. For example and without limitation, this can include the database system multiplying Account Y's 8 digit unique identifier by Organization B's 32 bit prime number to calculate a product, dividing this calculated product by 8,000,000,000 to result in a quotient and a remainder, and using the remainder as the hash value for the combination of Organization B and Account Y. Since there are only 203,280,220 32-bit prime numbers, the database system may multiply an identifier by a 64-bit prime number instead. Although this example describes the database system generating a hash value by multiplying an item identifier by a prime number to create a product, dividing this product by the size of the array to result in a quotient and a remainder, and using the remainder as the generated hash value, the database system may generate this hash value by applying any of type of hash function to the item identifier. While this example describes the database system generating only one hash value by applying only one hash function to an item identifier associated with a system user, the database system may generate any number of hash values by applying any number of hash functions to the same item identifier associated with the same system user.

Having generated a second hash value, the system sets a bit corresponding to the second hash value in the array, block 116. This bit indicates that the second item is in the second system user's set of items. By way of example and without limitation, this can include the database system setting the bit for the Organization B-Account Y hash value in the bit array. Although this example describes the database system setting only one bit corresponding to only one hash value generated for a combination of item identifier and system user, the database system may set any number of bits corresponding to any number of hash values generated for the same combination of item identifier and system user.

After setting bits in an array for identified items, the system receives a request to determine whether a third item is associated with the first system user, block 118. Receiving this request prompts the system to test an array bit which can indicate that the third item is in the first user's set of items. In embodiments, this can include the database system receiving a request to determine whether Organization A has purchased the rights to access Account Z. As noted above, a system user can be anyone or anything that the database system can associate with an item, such as an organization, a person, or a person in an organization. An extremely simplified example of the database system processing a request to determine whether Organization A has purchased the rights to access Account Z is described below in reference to FIG. 2.

Having identified a third item and a first system user, the system generates a third hash value by applying the first hash function to a third item identifier associated with the third item, block 120. This third hash value enables the system to test an array bit which can indicate that the third item is in the first user's set of items. For example and without limitation, this can include the database system multiplying Account Z's 8 digit unique identifier by Organization A's 32 bit prime number to calculate a product, dividing this calculated product by 8,000,000,000 to result in a quotient and a remainder, and using the remainder as the hash value for the combination of Organization A and Account Z. Although this example describes the database system generating a test hash value by multiplying an item identifier by a prime number to create a product, dividing this product by the size of the array to result in a quotient and a remainder, and using the remainder as the generated test hash value, the database system may generate this test hash value by applying any of type of hash function to the item identifier. While this example describes the database system generating only one test hash value by applying only one hash function to an item identifier for an item which might be associated with a system user, the database system may generate any number of test hash values by applying any number of hash functions to the same item identifier for the same item that might be associated with the same system user.

After generating a third hash value, the system determines whether a bit corresponding to the third hash value is set in the array, block 122. The bit can indicate whether the third item is in the first user's set of items. By way of example and without limitation, this can include the database system determining whether the bit for the Organization A-Account Z hash value is set in the array. Although this example describes the database system determining if only one bit corresponding to only one test hash value for an item-user combination is set in a bit array, the database system may determine if any number of bits corresponding to any number of test hash values for the same item-user combination are set in a bit array. If the bit corresponding to the third hash value is not set in the array, the method 100 continues to block 124. If the database system uses multiple hash functions to generate multiple test hash values for the same item-user combination, the method 100 continues to block 124 if any of the bits corresponding to the multiple test hash values is not set. If the bit corresponding to the third hash value is set in the array, the method 100 proceeds to block 126. If the database system uses multiple hash functions to generate multiple test hash values for the same item-user combination, the method 100 continues to block 126 if all of the bits corresponding to the multiple test hash values are set.

If the bit corresponding to the third hash value is not set in the array, the system outputs a message specifying that the third item is not associated with the first user, block 124. This message indicates that the system will not need to read the third item from a relatively slow access device. In embodiments, this can include the database system outputting a message specifying that Organization A has not purchased the rights to access Account Z because the bit corresponding to the Organization A-Account Z hash value is not set in the bit array. If the database system uses multiple hash functions to generate multiple test hash values for the same item-user combination, the database system outputs a message specifying that Organization A has not purchased the rights to access Account Z if any of the multiple bits corresponding to the multiple Organization A-Account Z hash values is not set in the bit array. The database system avoided spending a significant amount of resources accessing a relatively slow disk to determine that Organization A had not already purchased the rights to access Account Z. Then the method 100 terminates.

If the bit corresponding to the third hash value is set in the array, the system outputs a message specifying that the third item is associated with the first user, block 126. This message indicates that the system will need to read the third item from a relatively slow access device. For example and without limitation, this can include the database system outputting a message specifying that Organization A has purchased the rights to access Account Z because the bit corresponding to the Organization A-Account Z hash value is set in the bit array. If the database system uses multiple hash functions to generate multiple test hash values for the same item-user combination, the database system outputs a message specifying that Organization A has purchased the rights to access Account Z if all of the multiple bits corresponding to the multiple Organization A-Account Z hash values are set in the bit array. The database system avoided spending a significant amount of resources accessing a relatively slow disk to determine that Organization A had already purchased the rights to access Account Z. Since the bit(s) for Organization A-Account Z hash value(s) is (are) set in the bit array, the database system reads the Account Z information from a disk, which enables Organization A to view the Account Z information read from the disk. Then the method 100 terminates.

The method 100 may be repeated as desired. Although this disclosure describes the blocks 102-126 executing in a particular order, the blocks 102-126 may be executed in a different order. In other implementations, each of the blocks 102-126 may also be executed in combination with other blocks and/or some blocks may be divided into a different set of blocks.

Figure 2:
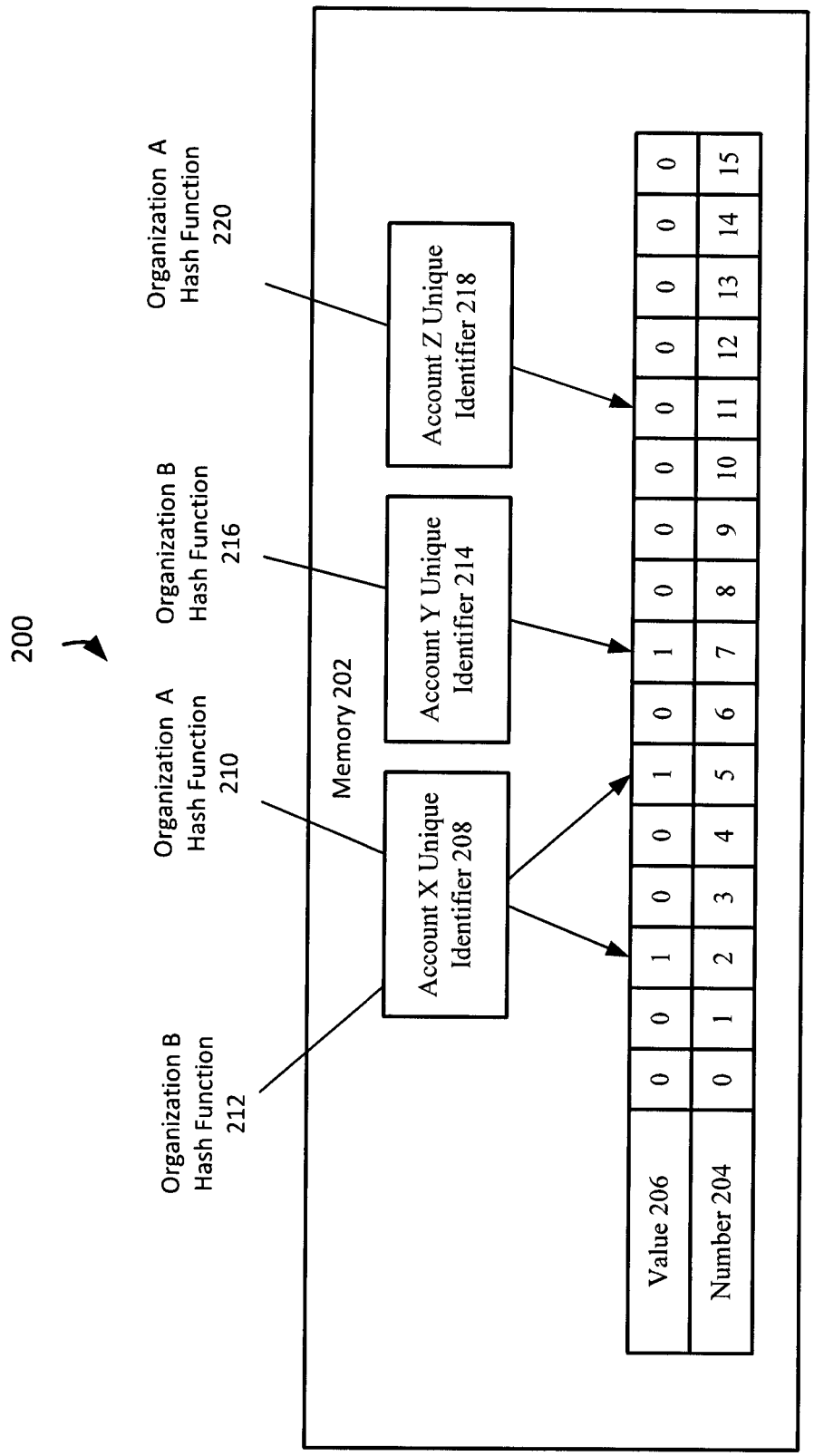
FIG. 2 illustrates a block diagram of an extremely simplified example of a multi-user probabilistic array, in an embodiment.

FIG. 2 illustrates a block diagram of an extremely simplified example of a multi-user probabilistic array, in an embodiment. The array 200 is an extremely simplified example of a multi-user probabilistic array because the array 200 has only 16 bits (bits numbered 0 to 15), whereas a multi-user probabilistic array may have 1 gigabyte of bits (8,000,000,000 bits). The array 200 is stored in memory 202, has a number 204 row that identifies the bit numbers for the array 200, and also has a value 206 row in which the corresponding bit values are stored in the array 200.

First, the database system receives a message indicating that Organization A has purchased the rights to access Account X, which is identified by Account X's unique identifier 208. Although Account X's unique identifier 208 may be retained in the memory 202, the database system receives Organization A's hash function 210 from outside of the memory 202, such as from Organization A when Organization A submits the request to purchase the rights to access Account X, from another memory that is separate from the memory 202, or from a relatively fast access device, such as a flash drive. The database system generates the hash value of 2 by applying Organization A's hash function 210 to Account X's unique identifier 208, and sets bit number 2, because it corresponds to the hash value of 2, in the array 200. Although the database system can generate multiple hash values by applying multiple Organization A hash functions to Account X's unique identifier 208, for simplification purposes the example depicted in FIG. 2 depicts the database system generating only one hash value of 2 by applying only one Organization A hash function 210 to Account X's unique identifier 208.

Next, the database system receives a message indicating that Organization B has also purchased the rights to access Account X, which is identified by Account X's unique identifier 208. Although Account X's unique identifier 208 may be retained in the memory 202, the database system receives Organization B's hash function 212 from outside of the memory 202, such as from Organization B when Organization B submits the request to purchase the rights to access Account X, from another memory that is separate from the memory 202, or from a relatively fast access device, such as a flash drive. The database system generates the hash value of 5 by applying Organization B's hash function 212 to Account X's unique identifier 208, and sets bit number 5, because it corresponds to the hash value of 5, in the array 200. Although the database system can generate multiple hash values by applying multiple Organization B hash functions to Account X's unique identifier 208, for simplification purposes the example depicted in FIG. 2 depicts the database system generating only one hash value of 5 by applying only one Organization B hash function 212 to Account X's unique identifier 208.

Then the database system receives a message indicating that Organization B has also purchased the rights to access Account Y, which is identified by Account Y's unique identifier 214. Although Account Y's unique identifier 214 may be retained in the memory 202, the database system receives Organization B's hash function 216 from outside of the memory 202, such as from Organization B when Organization B submits the request to purchase the rights to access Account Y, from another memory that is separate from the memory 202, or from a relatively fast access device, such as a flash drive. Organization B's hash function 216 is the same hash function as Organization B's hash function 212, but is referenced by a different reference numeral 216 to indicate receipt by the database system at a different point in time. The database system generates the hash value of 7 by applying Organization B's hash function 216 to Account Y's unique identifier 214, and sets bit number 7, because it corresponds to the hash value of 7, in the array 200. Although the database system can generate multiple hash values by applying multiple Organization B hash functions to Account Y's unique identifier 214, for simplification purposes the example depicted in FIG. 2 depicts the database system generating only one hash value of 7 by applying only one Organization B hash function 216 to Account Y's unique identifier 214.

A computer might gain unauthorized access to the memory 202 that includes the array 200, the Account X unique identifier 208, the Account Y unique identifier 214, and the Account Z unique identifier 218. However, the unauthorized computer would have no way to determine which organization owns which account because the unauthorized computer would not have access to the Organization A hash functions 210 and 220 or the Organization B hash functions 212 and 216 that are not retained in the memory 202. The result of the database system receiving the Organization A hash functions 210 and 220 and the Organization B hash functions 212 and 216 from outside of the memory 202 is an encryption of the organizations' data stored in the array 200. Even if the unauthorized computer accessed the memory 202 during the extremely short time when either of the Organization A hash functions 210 and 220 was temporarily stored in the memory 202 for the purposes of setting or testing a bit in the array 200, Organization B's data stored in the array 200 would remain encrypted.

Although not depicted in FIG. 2, if the Account X unique identifier 208, the Account Y unique identifier 214, and the Account Z unique identifier 218 were also not retained in the memory 202, and were instead received along with a hash function from a corresponding organization, then the organizations' data stored in the array 200 would be further encrypted. If the account identifiers were also not retained in the memory 202, the unauthorized computer would not be able to determine which organizations own which accounts even if the unauthorized computer had accessed the memory 202 during the extremely short time when the memory 202 temporarily stored an organization's hash function for the purposes of testing a bit in the array 200.

Finally, the database system receives a request to determine whether Organization A has already purchased the rights to access Account Z, which is identified by Account Z's unique identifier 218. Although Account Z's unique identifier 218 may be retained in the memory 200, the database system receives Organization A's hash function 220 from outside of the memory 202, such as from Organization A when Organization A submits the request to determine whether Organization A has already purchased the rights to access Account Z, from another memory that is separate from the memory 202, or from a relatively fast access device, such as a flash drive. Organization A's hash function 220 is the same hash function as Organization A's hash function 210, but is referenced by a different reference numeral 220 to indicate receipt by the database system at a different point in time. The database system generates a hash value of 11 by applying Organization A's hash function 220 to Account Z's unique identifier 218. Although the database system can generate multiple hash values by applying multiple Organization A hash functions to Account Z's unique identifier 218, for simplification purposes the example depicted in FIG. 2 depicts the database system generating only one hash value of 11 by applying only one Organization A hash function 220 to Account Z's unique identifier 218.

The database system concludes by outputting a message specifying that Organization A has not purchased the rights to access Account Z because bit number 11, which corresponds to the hash value of 11, is not set in the array 200. If the database system uses multiple hash functions to generate multiple hash values for the same account-organization combination, the database system concludes by outputting a message specifying that Organization A has not purchased the rights to access Account Z if any of the bits corresponding to the multiple hash values is not set. The database system avoided spending a significant amount of resources accessing a relatively slow disk to determine that Organization A had not already purchased the rights to access Account Z.

Although not depicted in FIG. 2, if bit number 11, which corresponds to the hash value of 11, was set in the array 200, then the database system would conclude by outputting a message specifying that Organization A has purchased the rights to access Account Z. If the database system uses multiple hash functions to generate multiple hash values for the same account-organization combination, the database system would conclude by outputting a message specifying that Organization A has purchased the rights to access Account Z if all of the bits corresponding to the multiple hash values were set. The database system would have avoided spending a significant amount of resources accessing a relatively slow disk to determine that Organization A had already purchased the rights to access Account Z. If bit number 11 for the Organization A-Account Z hash value was set in the bit array, the database system would read the Account Z information from a disk, which would enable Organization A to view the Account Z information read from the disk.

System Overview

Figure 3:
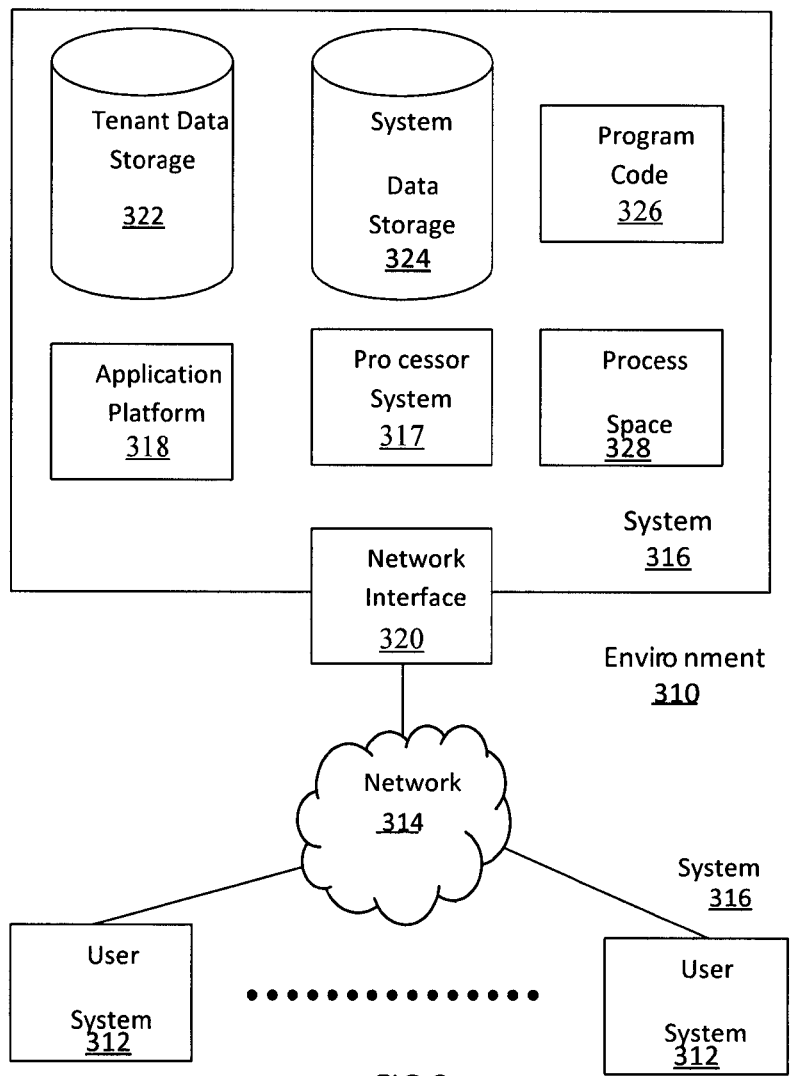
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
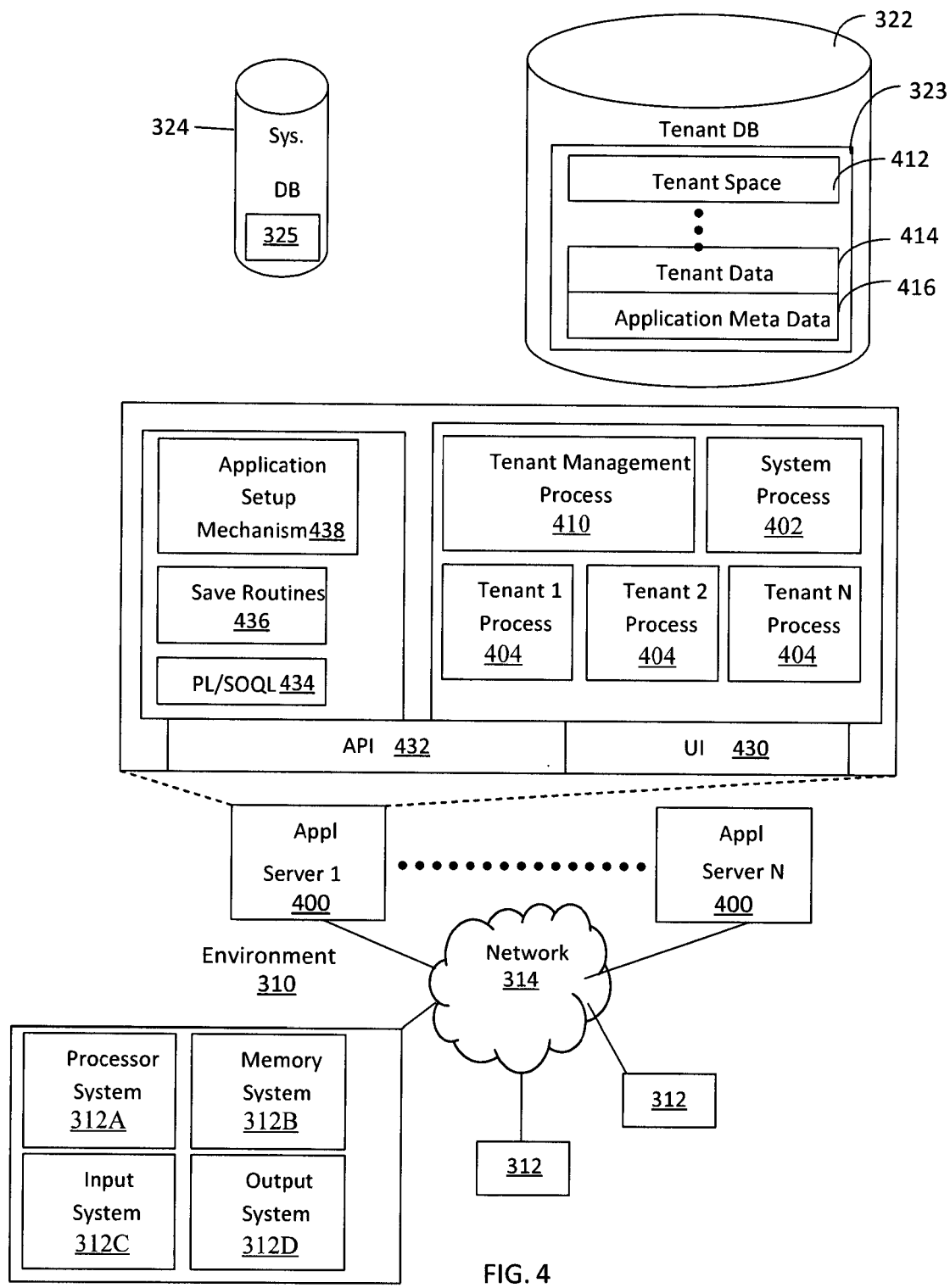
FIG. 4 illustrates a block diagram of an embodiment of elements of FIG. 2 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in reference to FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for a multi-user probabilistic array, the system comprising:
   one or more processors; and
   a non-transitory computer readable medium storing a plurality of instructions, which when executed, cause the one or more processors to:
   generate a first hash value by applying a first hash function, that is received from and uniquely associated with a first system user, to an identifier of a first item, the first item being associated with the first system user;
   set a bit corresponding to the first hash value in an array;
   generate a second hash value by applying a second hash function, that is received from and uniquely associated with a second system user, to an identifier of a second item, the second item being associated with the second system user;
   set a bit corresponding to the second hash value in the array;
   generate a third hash value by applying the first hash function to an identifier of a third item, the third hash value being generated in response to receiving a request to determine whether the third item is associated with the first system user;
   determine whether a bit corresponding to the third hash value is set in the array; and
   cause a message to be outputted, in response to a determination that the bit corresponding to the third hash value is not set in the array, the message specifying that the third item is not associated with the first user.

2. The system of claim 1, wherein applying the first hash function to the first item identifier comprises creating a product by multiplying the first item identifier by a prime number, and creating both a quotient and a remainder by dividing the product by a number associated with a size of the array, the first hash value comprising the remainder.

3. The system of claim 1, wherein the array is stored in a computer memory and the first hash function is received from outside the computer memory.

4. The system of claim 1, comprising further instructions, which when executed, cause the one or more processors to:
generate an additional hash value by applying an additional hash function, that is received from and uniquely associated with the first system user to the first item identifier; and
set a bit corresponding to the additional hash value in the array.

5. The system of claim 1, wherein the first system user is a first tenant in a multi-tenant database system and the second system user is a second tenant in the multi-tenant database system.

6. The system of claim 1, comprising further instructions, which when executed, cause the one or more processors to output a message, in response to a determination that the bit corresponding to the third hash value is set in the array, the message specifying that the third item is associated with the first user.

7. A computer program product comprising computer-readable program code to be executed by one or more processors when retrieved from a non-transitory computer-readable medium, the program code including instructions to:
generate a first hash value by applying a first hash function, that is received from and uniquely associated with a first system user to an identifier of a first item, the first item being associated with the first system user;
set a bit corresponding to the first hash value in an array;
generate a second hash value by applying a second hash function, that is received from and uniquely associated with a second system user to an identifier of a second item, the second item being associated with the second system user;
set a bit corresponding to the second hash value in the array;
generate a third hash value by applying the first hash function to an identifier of a third item, the third hash value being generated in response to receiving a request to determine whether the third item is associated with the first system user;
determine whether a bit corresponding to the third hash value is set in the array; and
cause a message to be outputted, in response to a determination that the bit corresponding to the third hash value is not set in the array, the message specifying that the third item is not associated with the first user.

8. The computer program product of claim 7, wherein applying the first hash function to the first item identifier comprises creating a product by multiplying the first item identifier by a prime number, and creating both a quotient and a remainder by dividing the product by a number associated with a size of the array, the first hash value comprising the remainder.

9. The computer program product of claim 7, wherein the array is stored in a computer memory and the first hash function is received from outside the computer memory.

10. The computer program product of claim 7, wherein the program code comprises further instructions to:
generate an additional hash value by applying an additional hash function, that is received from and uniquely associated with the first system user to the first item identifier; and
set a bit corresponding to the additional hash value in the array.

11. The computer program product of claim 7, wherein the first system user is a first tenant in a multi-tenant database system and the second system user is a second tenant in the multi-tenant database system.

12. The computer program product of claim 7, wherein the program code comprises further instructions to cause a message to be outputted, in response to a determination that the bit corresponding to the third hash value is set in the array, the message specifying that the third item is associated with the first user.

13. A method comprising:
generating, by a database system, a first hash value by applying a first hash function, that is received from and uniquely associated with a first system user to an identifier of a first item, the first item being associated with the first system user;
setting, by the database system, a bit corresponding to the first hash value in an array;
generating, by the database system, a second hash value by applying a second hash function, that is received from and uniquely associated with a second system user to an identifier of a second item, the second item being associated with the second system user;
setting, by the database system, a bit corresponding to the second hash value in the array;
generating, by the database system, a third hash value by applying the first hash function to an identifier of a third item, the third hash value being generated in response to receiving a request to determine whether the third item is associated with the first system user;
determining, by the database system, whether a bit corresponding to the third hash value is set in the array; and
causing, by the database system, a message to be outputted in response to a determination that the bit corresponding to the third hash value is not set in the array, the message specifying that the third item is not associated with the first user.

14. The method of claim 13, wherein applying the first hash function to the first item identifier comprises creating a product by multiplying the first item identifier by a prime number, and creating both a quotient and a remainder by dividing the product by a number associated with a size of the array, the first hash value comprising the remainder.

15. The method of claim 13, wherein the array is stored in a computer memory, and the first hash function is received from outside the computer memory.

16. The method of claim 13, wherein the method further comprises:
generating, by the database system, an additional hash value by applying an additional hash function, that is received from and uniquely associated with the first system user to the first item identifier; and
setting, by the database system, a bit corresponding to the additional hash value in the array.

17. The method of claim 13, wherein the first system user is a first tenant in a multi-tenant database system and the second system user is a second tenant in the multi-tenant database system.

18. The method of claim 13, wherein the method further comprises causing, by the database system, in response to a determination that the bit corresponding to the third hash value is set in the array, a message to be outputted specifying that the third item is associated with the first user.

* * * * *